United States Patent [19]

Stockmar

[11] Patent Number: 4,844,219
[45] Date of Patent: Jul. 4, 1989

[54] FLUID FRICTION COUPLINGS

[75] Inventor: Jürgen Stockmar, Graz, Austria

[73] Assignee: Steyr-Daimler-Puch AG, Vienna, Austria

[21] Appl. No.: 69,363

[22] Filed: Jul. 2, 1987

Related U.S. Application Data

[63] Continuation-in-part of Ser. No. 773,376, Sep. 9, 1985, abandoned.

[30] Foreign Application Priority Data

Sep. 7, 1984 [AT] Austria ................................ 2868/84

[51] Int. Cl.$^4$ ............................................. F16D 35/00
[52] U.S. Cl. .................................. 192/58 C; 192/58 R; 192/70.28
[58] Field of Search ................ 192/58 R, 58 B, 58 C, 192/70.28, 85 AA; 74/711

[56] References Cited

U.S. PATENT DOCUMENTS

| | | | |
|---|---|---|---|
| 2,217,357 | 10/1940 | Coe | 192/70.28 |
| 3,261,230 | 7/1966 | Rudnicki | 192/82 T |
| 3,584,720 | 6/1971 | Bark | 192/70.28 |
| 3,613,848 | 10/1971 | Reiff | 192/70.28 |
| 3,624,769 | 11/1971 | Hansen | 192/85 AA |
| 3,913,713 | 10/1975 | F'geppert | 192/70.25 |
| 3,923,113 | 12/1975 | Pagdin | 192/57 |
| 4,031,780 | 6/1977 | Dolan et al. | 74/711 |
| 4,040,271 | 8/1977 | Rolt et al. | 192/58 B |
| 4,058,027 | 11/1977 | Webb | 74/711 |
| 4,362,227 | 12/1982 | Walton et al. | 192/70.28 |
| 4,548,306 | 10/1985 | Hartz | 192/70.28 |
| 4,683,997 | 8/1987 | Stockmar et al. | 192/58 C |
| 4,683,998 | 8/1987 | Cigdem et al. | 192/58 C |

FOREIGN PATENT DOCUMENTS

| | | | |
|---|---|---|---|
| 2453562 | 5/1976 | Fed. Rep. of Germany | 192/82 T |
| 3539484 | 12/1986 | Fed. Rep. of Germany | 192/58 C |
| 776210 | 10/1934 | France | 192/58 C |
| 204320 | 12/1982 | Japan | 192/58 B |
| 531942 | 10/1976 | U.S.S.R. | 192/70.28 |

Primary Examiner—Rodney H. Bonck
Assistant Examiner—David A. Testardi
Attorney, Agent, or Firm—Marmorek, Guttman & Rubenstein

[57] ABSTRACT

A fluid friction coupling or clutch unit is disclosed. The coupling includes a housing which is substantially filled with a viscous liquid. The housing comprises inner and outer parts which are concentrically disposed and rotate about an axis. The fluid friction coupling also includes mutually interleaved inner and outer plates within the housing, the inner plates being coupled to rotate with the inner part of the housing and outer plates being coupled to rotate with the outer part of the housing. The individual inner and outer plates are separated from each other and are axially displaceable so as to vary the size of the gap between them. Annular disc springs are disposed within the gaps between the plates. The annular disc springs are shaped as truncated cones. They act to spread the plates apart. In a preferred embodiment, the fluid friction coupling also includes a pressure body connected to the inner and outer plates. The pressure body is actuated by a hydraulically or mechanically driven piston which applies a counterforce to the inner and outer plates in opposition to the resilience of the annular disc springs. Thus, the size of the gaps between the plates can be regulated by the pressure applied to the plates.

9 Claims, 2 Drawing Sheets

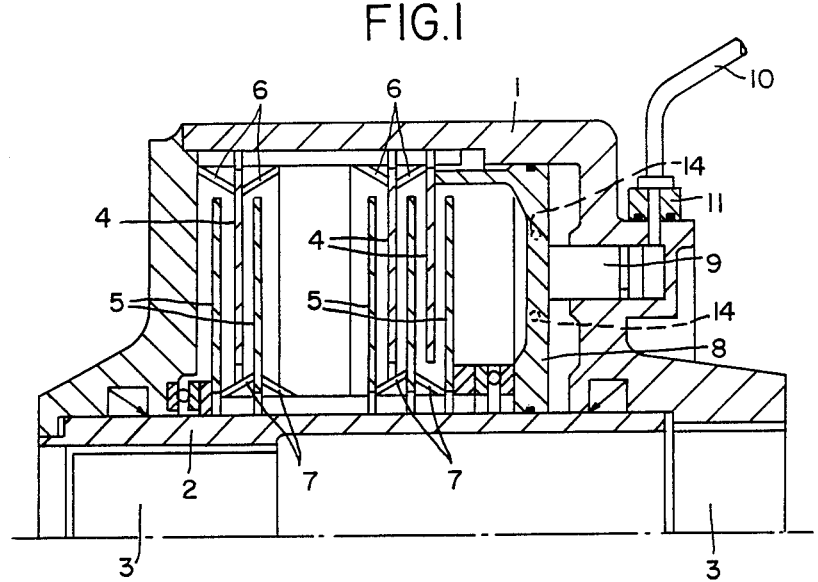
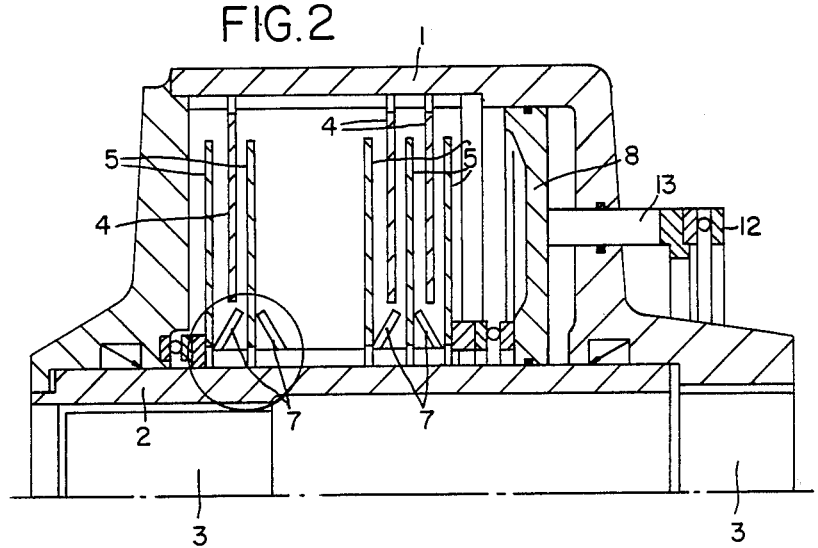

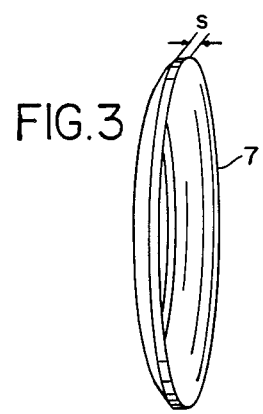
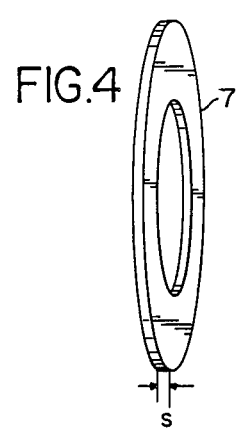
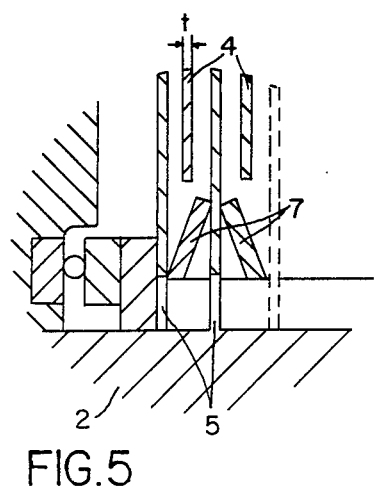
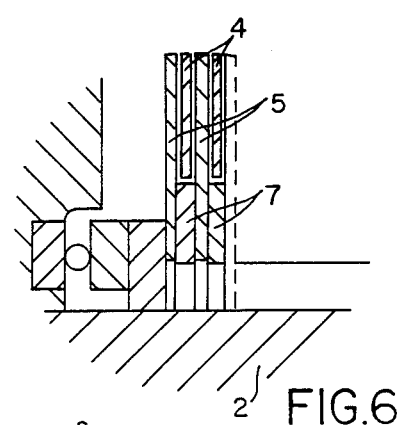
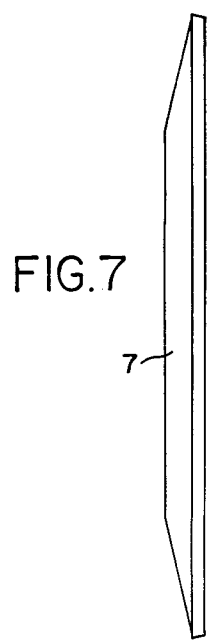
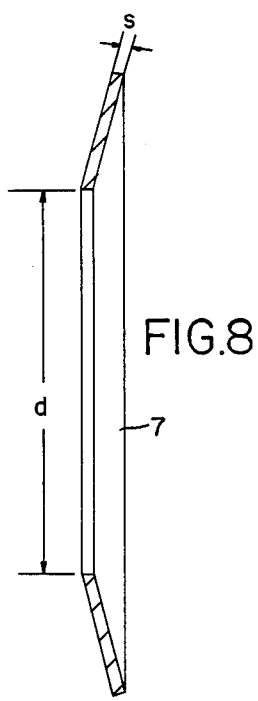

FLUID FRICTION COUPLINGS

BACKGROUND OF THE INVENTION

This is a continuation-in-part of U.S. patent application Ser. No. 773,376, filed Sept. 9, 1985, now abandoned.

The present invention relates to a fluid friction coupling or clutch unit having interengaging sets of plates which are coupled to a housing substantially filled with a viscous liquid. More particularly, this invention relates to such a fluid friction coupling wherein the plates are separated from one another and are axially displaceable so as to vary the gap between them.

In fluid friction clutches having interengaging sets of plates wherein one set of plates drives the other set of plates, torque is transmitted by the shearing stresses which arise in a viscous fluid disposed in the gaps between the set of plates. The speed of rotation of the driven set of plates and the slippage which occurs within the fluid friction clutch unit, can be regulated by varying the gap width between the plate members, the transferable torque being inversely proportional to the gap width.

In a fluid friction clutch of this type which is described in U.S. Pat. No. 1,238,447, the two sets of elements forming the coupling members are constructed as discs having a plurality of coaxial ring dogs or lugs, the ring lugs being double-conical, i.e., formed with conical inner and outer peripheral surfaces, so that each of the two sets of elements appears comb-like in radial cross-section. The ring lugs of the two discs are directed towards each other and radially offset in alignment with gaps, so that the ring lugs of the one disc can engage into the ring gap of the other discs when an axial displacement of the coupling members represented by the ring lugs takes place. Since these ring lugs have conical inner and outer surfaces, a different gap width results between the interengaging coupling members depending on the depth of penetration of the ring lugs. Thus, the magnitude of torque transferred can be regulated by varying the degree to which the ring lugs penetrate each other.

The fluid friction clutch of U.S. Pat. No. 1,238,447 is of comparatively complicated design, and is expensive to produce, because the discs forming the interengaging elements of the coupling members having the ring lugs must be made with high tolerances. Thus, they cannot be made easily and simply from sheet metal and the like, but require accurate finishing. In addition, fluid friction coupling units of this type must be relatively large in order that the effective surfaces of the coupling members be large enough to transmit relatively high torques. Finally, the design of this fluid friction coupling, in which the gaps are varied by pushing the ring lugs forward or drawing them backwards is an inefficient and complicated design.

A shiftable friction clutch of a different sort is disclosed in European Patent No. 11,908. In this friction clutch, the coupled members are formed as mutually interleaved inner and outer plates which are connected to inner and outer portions of a housing. The inner and outer plates of the friction clutch are axially displaceable by means of a pressure body which can be hydraulically activated. However, the friction clutch of this patent differs from that described hereinabove in many respects. For example, the friction clutch of this patent does not include a viscous fluid. Thus, torque is transferred by pure frictional engagement between the inner and outer plates rather than by the shearing stresses arising in a fluid disposed between the plates. Furthermore, the pressure body disclosed in this patent serves only for engaging and disengaging the plates, rather than to vary the torque which is transmitted between the plates.

British Patent No. 1,412,583 discloses a fluid friction coupling having mutually interleaved inner and outer plates in which torque is transferred by means of a viscous fluid disposed in the gaps between the plates. The fluid friction coupling unit of this patent includes spacers disposed in the gaps between the plates. However, the fluid friction coupling unit of this patent differs from that disclosed herein in failing to provide any means by which the gap width can be actively and dynamically adjusted. Thus, the fluid friction coupling unit of this patent does not contain any biasing elements between the plates which act to spread the plates apart, nor a pressure body which adjusts the magnitude of the gap between the plates.

Accordingly, it is an object of the present invention to provide a fluid friction coupling unit having mutually interengaging sets of plates, wherein the plates are separated from one another and have a viscous fluid therebetween to couple the plates together in rotation.

It is also an object of the present invention to provide such a fluid friction coupling unit wherein the separation between the plates can be actively varied.

It is yet another object of the present invention to provide such a clutch unit which is relatively small, easy to construct, and inexpensive to produce.

SUMMARY OF THE INVENTION

These and other objects are accomplished by means of the present invention which provides a fluid friction coupling unit, comprising a housing substantially filled with a viscous fluid, and mutually interleaved inner and outer plates, which are coupled to the housing for rotation about a longitudinal axis within the housing. The individual inner and outer plates are separated from each other and biasing members, such as annular disc springs, are inserted in the gaps between the plates and act to spread the plates apart. Hydraulically or mechanically activated means are also provided to apply pressure to the plates in opposition to the force of the spring, and thus to vary the gaps between the plates.

In the fluid friction clutch of the present invention, the pressure means serves the dual purpose of engaging and disengaging the clutch, as well as varying the spacing between the plate elements. The pressure means can be manually controlled by the operator, thus giving the operator control of the amount of torque generated by the clutch unit. The dimensions of the biasing elements, such as the disc springs, can be chosen so that even under the strongest action of the pressure means, there is no direct contact between the plate elements. The gap between the plate elements which is always present in such an arrangement guarantees that the transmission of the torque during operation of the coupling occurs only by means of the viscous fluid, i.e., by means of shear forces rather than by frictional engagement. Thus, even under high loads, at high temperatures, and high internal pressure, no transmission values rising to several times the usual torque can occur, although, such high values can be achieved, if desired. Furthermore, the disc springs need not be disposed between each of the plate elements, but can be disposed, for example, only between the inner or the outer plates. Thus, only one set of plates need be axially displaced, while the other set of plates remains axially fixed.

The surfaces of the annular disc springs of the present invention are substantially conical in shape. The disc springs, when unstressed, are in the shape of truncated cones. As the plates approach each other in response to an application of pressure, the annular disc springs are compressed between the plates evenly about the longitudinal axis within the housing and are flattened. Since the annular disc springs provide equal and opposing biasing force on both sides of each plate, no uneven force component is applied to the plates in the axial direction which would cause the plates to be deformed. Accordingly, after each movement, the plates are still positioned in parallel to each other.

In a preferred embodiment, the pressure applying means includes a piston which is slidingly guided within an aperture in the housing itself. The pressure applying means also includes holes in the housing on opposite sides of the piston. These holes permit release of some of the pressure build-up in the viscous fluid when pressure is applied by the piston. As a result, the torque transmitted between the plates will depend only on the gap between the plates and not on the internal pressure in the housing.

The fluid friction coupling or clutch unit of the present invention provides numerous advantages over prior art devices. The fluid friction coupling of the present invention is constructed in a manner similar to conventional multiple disc clutches and therefore is relatively simple to produce and inexpensive to manufacture. In addition, the clutch unit can have a small cross-sectional area since the necessary torque can be achieved by increasing the number of plates, rather than increasing the size of the plates. The small radial dimension is of particular importance in high-speed clutches since high centrifugal forces need not be generated.

Also, the co-action of a manually-controlled pressure body biasing the plates in one direction against the force of the annular disc springs biasing the plates in an opposite direction provides a fluid friction coupling which gives the operator more control over the amount of torque produced.

BRIEF DESCRIPTION OF THE DRAWINGS

FIG. 1 shows a cross-sectional view of one preferred embodiment of the present invention taken along a longitudinal axis.

FIG. 2 shows a similar view of another preferred embodiment of the invention.

FIG. 3 is an enlarged view showing an annular disc spring of the present invention in the unstressed position.

FIG. 4 is an enlarged view showing an annular disc of the present invention in the stressed position.

FIG. 5 is an enlarged view of the encircled portion of FIG. 2.

FIG. 6 is another enlarged view of the encircled portion o FIG. 2, showing the annular disc springs in a different position relative to the plates.

FIG. 7 is a side elevational view of annular disc springs.

FIG. 8 is a sectional view of the annular disc spring shown in FIG. 7.

DETAILED DESCRIPTION OF PREFERRED EMBODIMENTS

Referring to FIG. 1, the upper half of a fluid friction coupling of the present invention is depicted. The fluid friction coupling includes a housing having an outer part 1 and an inner part 2. Outer part 1 and inner part 2 are fluid-tight and serve to contain a viscous fluid in the housing. Outer part 1 and inner part 2 are concentrically disposed and freely rotatable about a longitudinal axis (not shown) of the fluid friction coupling. Inner part 2 is freely rotatable within outer part 1.

Parts 1 and 2 are connected by means of splines 3 to a drive shaft (not shown) and a driven shaft (not shown), respectively. As coupling members connected to outer part 1 and inner part 2, there are provided sets of plates 4 and 5. Plates 4 and 5 are mutually interleaved. Plates 4 and 5 are connected to parts 1 and 2 of the housing and are rotatable therewith about the longitudinal axis. Plates 4, being connected to outer part 1, are referred to herein as outer plates, while plates 5, being connected to inner part 2, are referred to herein as inner plates. Plates 4 and 5 are also displaceable along the longitudinal axis as further discussed hereinbelow.

As shown in FIG. 1, the individual plates are separated from each other. The viscous fluid which substantially fills the housing surrounds the outer plates 4 and inner plates and fills the gaps between the individual plate members. In accordance with the present invention, annular disc springs 6 and 7 are provided between the outer plates 4 and the inner plates 5 respectively. Annular disc springs 6 and 7, shown in greater detail in FIGS. 3 and 4, are constructed so as to push the plate members apart. Annular disc springs 6 and 7 are mounted in the fluid friction coupling so as to encircle inner part 1 and splines 3. Annular disc springs 6 and 7 closely resemble each other except that annular disc springs 6 are of substantially larger diameter than springs 7.

A pressure body 8 is also provided which is closely dimensioned to slide within an aperture provided in the housing. Pressure body 8 abuts against outer and inner plates 4 and 5 and applies pressure thereto in order to vary the plate spacing against the force of annular springs 6 and 7. Pressure body 8 is displaceable by means of a piston 9 which is actuated by a hydraulic line 10 via a slide ring 11.

If, as illustrated in FIG. 1, the pressure body 8 is closely received within the housing, the viscous fluid should not completely fill the inside of the housing. Thus, upon actuation of pressure body 8, the pressure of the viscous fluid would be altered and would additionally influence the torque transmission between the inner and outer plates. In order to avoid this, as shown in FIG. 1, holes 14 are provided on either side of piston 9. Holes 14 provide an escape for the viscous fluid when pressure is applied by pressure body 8. In this way, the magnitude of the torque transmitted between the plates will be regulated only by the spacing between plates 4 and 5.

FIG. 2 shows another preferred embodiment of the present invention similar to that shown in FIG. 1. However, in FIG. 2 annular disc springs 7 are provided between the inner plates 5, while no disc springs are provided between outer plates 4. In addition, pressure body 8 is not hydraulically operated, but is operated by means of a mechanically controlled finger 13 via a pressure ring 12. Finger 13 is slidingly received within outer part 1 of the housing and extends axially to abut against pressure body 8.

As depicted in FIGS. 3 and 4, an annular disc spring 7 is ring-shaped and has a hole in its middle. Annular disc springs 6 are substantially the same as annular disc springs 7, but larger in diameter. The surfaces of annular disc springs 7 are substantially flat.

In its unstressed position, the profile of an annular disc spring 7 resembles a truncated cone. This shape is depicted in FIG. 3. Annular disc spring 7 extends around inner part 2 and spline 3 between plates 5 by virtue of its hole. Likewise, annular disc springs 6 extend around inner part 2 and spline 3, but because of its larger diameter, the body of the ring rests between plates 4. The shape of disc springs 6 and 7 provides resilience so that they tend to push plates 4 and 5 apart and increase the magnitude of the gaps between the plate.

When pressure body 8 is actuated, the annular disc springs 6, 7 are compressed between plates 4, 5, thereby assuming a substantially flat profile, and thus resiliently urge plates 4 and 5 apart. The flattened shape of an annular disc spring 7 is depicted in FIG. 4. Because the springs on either side of plates 4, 5 are compressed or flattened at the same rate against the pressure exerted by pressure body 8, an even force is applied to the plates 4, 5 from either side, thereby preventing arching or other deformation of the plates. Thus, plates 4, 5 remain parallel to each other at all times, regardless of the pressure exerted by pressure body.

FIGS. 5 and 6 are enlarged views of the encircled portion of FIG. 2, and show the relationship of the annular disc springs 7 to the plates 4, 5. As pressure is applied to the inner plates 5 by pressure body 8, the disc springs 7 are compressed and flattened from the unstressed position depicted in FIG. 5 to the stressed position depicted in FIG. 6. The compression of the annular disc springs 7 against their biasing force occurs equally along the longitudinal axis of the housing. Accordingly, this arrangement allows an even force to be applied against the plates 5 from either axial direction.

Although FIGS. 5 and 6 depict the embodiment of FIG. 2, a similar relationship exists between the annular disc springs 6, 7 and the plates 4, 5 in the embodiment depicted in FIG. 1.

FIG. 7 is a side elevational view of annular disc spring 7, while FIG. 8 provides a sectional view of the same. The inner diameter d of the annular disc spring 7 is larger than the diameter D of inner part 2, illustrated in FIG. 2. Since both annular disc springs 6 and 7 have diameters which are larger than that of the inner part 2 and spline 3, the annular disc springs 6, 7 are movable along the longitudinal axis of the inner part 2 and spline 3. Therefore, the annular disc springs are able to adjust their positioning in response to any misalignment of the plates 4, 5.

Also, the thickness s of the annular disc spring 7, as illustrated in FIG. 8, is greater than the thickness t of the plates 4, 5, as best illustrated in FIGS. 5 and 6. Therefore, the plates 4, 5 can never come into contact with one another, even when the annular disc springs 6, 7 are compressed into a substantially flat profile.

While the invention has been described with reference to specific embodiments, this was for purposes of illustration only and should not be construed to limit the spirit or the scope of the invention.

What is claimed is:

1. A fluid friction coupling, comprising
a housing, said housing being substantially filled with a viscous fluid, said housing comprising inner and outer parts concentrically disposed for rotation about an axis,
mutually interleaved inner and outer annular plates, said inner and outer plates disposed within said housing and coupled to said inner and outer parts respectively for rotation about said axis, said inner and outer plates being separated at all times by gaps therebetween, said inner and outer plates being axially displaceable to vary the magnitude of said gaps, said inner and outer plates being rotationally coupled to each other by said viscous fluid,
annular disc springs disposed within selected ones of said gaps, said disc springs having the shape of a truncated cone when not being stressed, said disc springs resiliently biasing said inner and outer plates to increase the magnitude of said gaps, said disc springs preventing direct contact between said inner and outer plates, and
an actuable pressure body operatively connected to said inner and outer plates, said pressure body applying a counterforce to said inner and outer plates in opposition to said disc springs, said disc springs being flattened by the counterforce applied by said pressure body to said inner and outer plates, said actuable pressure body cooperating with said annular disc springs to adjust the magnitude of said gaps,
said pressure body abutting against at least one said inner and at least one said outer plate.

2. The fluid friction coupling of claim 1 wherein said disc springs are disposed circumferentially about said inner part.

3. The fluid friction coupling of claim 1 further comprising hydraulic means operatively connected to said pressure body for hydraulically actuating said pressure body.

4. The fluid friction coupling of claim 1 further comprising a piston operatively connected to said pressure body for actuating said pressure body.

5. The fluid friction coupling of claim 4, wherein said piston is hydraulically driven.

6. The pressure body of claim 1, wherein said pressure body is manually actuated.

7. A fluid friction coupling, comprising
a housing, said housing being substantially filled with a viscous fluid, said housing comprising inner and outer parts concentrically disposed for rotation about an axis
mutually interleaved inner and outer annular plates, said inner and outer plates disposed within said housing and coupled to said inner and outer parts respectively for rotation about said axis, said inner and outer plates being separated at all times by gaps therebetween, said inner and outer plates being axially displaceable to vary the magnitude of said gaps, said inner and outer plates being rotationally coupled to each other by said viscous fluid,
annular disc springs disposed within selected ones of said gaps, said disc springs having the shape of truncated cones when not being stressed, said disc springs resiliently biasing said inner and outer plates to increase the magnitude of said gaps, the thickness of said disc springs being greater than the thickness of said inner and outer annular plates thereby preventing direct contact between said inner and outer plates, and an actuable pressure body operatively connected to said inner and outer plates, said pressure body applying a counterforce to said inner and outer plates in opposition to said disc springs, said disc springs being flattened by the counterforce applied by said pressure body to said inner and outer plates, said actuable pressure body cooperating with said annular disc springs to adjust the magnitude of said gaps.

8. The fluid friction coupling of claim 7 further comprising mechanical means operatively connected to said pressure body for mechanically actuating said pressure body.

9. The fluid friction coupling of claim 1 further comprising a piston operatively connected to said pressure body for actuating said pressure body, wherein said piston is mechanically driven.

* * * * *